(12) United States Patent
Cha

(10) Patent No.: US 11,606,322 B2
(45) Date of Patent: Mar. 14, 2023

(54) METHODS, SYSTEMS AND RECORDING MEDIUMS FOR PROVIDING MESSENGER SERVICE HAVING SPECIFIC CONDITION

(71) Applicant: LINE Corporation, Tokyo (JP)

(72) Inventor: Ki Yong Cha, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 1350 days.

(21) Appl. No.: 14/840,501

(22) Filed: Aug. 31, 2015

(65) Prior Publication Data

US 2016/0197866 A1 Jul. 7, 2016

(30) Foreign Application Priority Data

Jan. 2, 2015 (KR) .................. 10-2015-0000137

(51) Int. Cl.
*H04L 51/212* (2022.01)
*H04L 51/214* (2022.01)
*H04L 51/224* (2022.01)
*H04L 51/04* (2022.01)

(52) U.S. Cl.
CPC .......... *H04L 51/212* (2022.05); *H04L 51/214* (2022.05); *H04L 51/04* (2013.01); *H04L 51/224* (2022.05)

(58) Field of Classification Search
CPC ......... H04L 51/12; H04L 51/24; H04L 51/04; H04L 51/212; H04L 51/214; H04L 51/224
See application file for complete search history.

(56) References Cited

U.S. PATENT DOCUMENTS

| | | | |
|---|---|---|---|
| 6,023,723 A * | 2/2000 | McCormick | G06Q 10/107 707/999.001 |
| 7,290,033 B1 * | 10/2007 | Goldman | H04L 51/12 709/206 |
| 7,613,726 B1 * | 11/2009 | Spivak | G06F 16/9535 |
| 8,266,218 B2 * | 9/2012 | Keohane | G06F 3/04817 709/206 |
| 8,441,356 B1 * | 5/2013 | Tedesco | G08B 21/02 340/573.1 |
| 2004/0078447 A1 | 4/2004 | Malik et al. | |

(Continued)

FOREIGN PATENT DOCUMENTS

CN 101394373 A 3/2009
CN 102769583 A 11/2012
(Continued)

OTHER PUBLICATIONS

KR 20140123728—Machine translation (Year: 2013).*
(Continued)

*Primary Examiner* — George C Neurauter, Jr.
(74) *Attorney, Agent, or Firm* — Harness, Dickey & Pierce, P.L.C.

(57) ABSTRACT

A social network service method implemented with a computer is provided which includes receiving at least one control condition for controlling an operation of a social network service from a user, generating a folder operated by the at least one control condition, associating at least one chatting element with the folder, and determining whether to control the operation of the social network service based on the at least one control condition, in response to a message from a conversation partner associated with the at least one chatting element.

22 Claims, 11 Drawing Sheets

(56) References Cited

U.S. PATENT DOCUMENTS

| | | | |
|---|---|---|---|
| 2008/0162642 | A1 | 7/2008 | Bachiri et al. |
| 2009/0235196 | A1* | 9/2009 | MacBeth ............ G06F 3/04842 |
| | | | 715/780 |
| 2012/0151380 | A1* | 6/2012 | Bishop ................ G06Q 10/107 |
| | | | 715/752 |
| 2013/0116044 | A1* | 5/2013 | Schwartz .............. A63F 13/77 |
| | | | 463/29 |
| 2013/0204946 | A1* | 8/2013 | Forstall ................ G06F 3/0482 |
| | | | 709/206 |
| 2013/0297700 | A1* | 11/2013 | Hayton ................ G06Q 10/10 |
| | | | 709/204 |
| 2014/0025752 | A1* | 1/2014 | DeLuca ................ G06Q 50/01 |
| | | | 709/206 |
| 2014/0108506 | A1* | 4/2014 | Borzycki ............ H04L 67/1095 |
| | | | 709/203 |
| 2014/0181696 | A1* | 6/2014 | Christensen ......... G06Q 10/107 |
| | | | 715/756 |
| 2015/0156150 | A1* | 6/2015 | Bartkiewicz ............ G06F 3/048 |
| | | | 715/752 |
| 2015/0372953 | A1* | 12/2015 | Davis ................... H04M 3/436 |
| | | | 455/412.2 |

FOREIGN PATENT DOCUMENTS

| | | |
|---|---|---|
| CN | 103003874 A | 3/2013 |
| JP | 2013-225290 A | 10/2013 |
| KR | 2002-0074303 A | 9/2002 |
| KR | 20060082354 A | 7/2006 |
| KR | 20100032727 A | 3/2010 |
| KR | 20140014681 A | 2/2014 |
| KR | 20140122000 A | 10/2014 |
| KR | 20140123728 A | 10/2014 |

OTHER PUBLICATIONS

KR 10-2014-0026505 by SEO (Machine Translation) (Year: 2014).*
Machine translation: WO2014061871A1 by Choi (Year: 2013).*
Korean Office Action dated Aug. 20, 2015 corresponding to KR 10-2015-0000137.
International Search Report dated Mar. 30, 2016 corresponding to International application No. PCT/KR2015/014229.
Korean Office Action dated May 20, 2016, issued in corresponding Korean Application No. 10-2016-0044342.
Chinese Office Action dated Nov. 4, 2019 in Chinese Application No. 201580071975.

* cited by examiner

METHODS, SYSTEMS AND RECORDING MEDIUMS FOR PROVIDING MESSENGER SERVICE HAVING SPECIFIC CONDITION

CROSS-REFERENCE TO RELATED APPLICATIONS

This application claims priority under 35 U.S.C. § 119 to Korean Patent Application No. 10-2015-0000137 filed Jan. 2, 2015, in the Korean Intellectual Property Office, the entire contents of which are incorporated herein by reference.

BACKGROUND

1. Field

One or more example embodiments of inventive concepts described herein relate to technologies for controlling messenger services based on specific conditions.

2. Description of Related Art

Conventional instant messenger software is capable of sending and receiving messages and/or data in real time. Users may register a conversation partner on a messenger, and exchange messages with a partner in a conversation partner list.

Instant messengers are widely used even in mobile environments of mobile communication terminals as well as personal computers (PCs). Disclosed in the KR patent publication No. 2002-0074303 are, for example, mobile messenger service system, and method of a portable terminal using a wireless communication network, to enable a messenger service to be provided between mobile messengers installed on the portable terminals.

Messenger services may be used for transactional purposes (e.g., inter-office messenger or the like) as well as personal purposes. However, coexistence of various purposes may make it relatively difficult and/or confusing to use related art messenger services.

SUMMARY

One or more example embodiments of inventive concepts provide methods, systems, and/or computer-readable storage mediums, capable of providing messenger services controlled according to specific conditions.

One or more example embodiments of inventive concepts provide methods, systems, and/or computer-readable storage mediums, capable of restricting operations of messengers, including message transmission and reception, generation of a chat room, and the like, using specific conditions set to folders.

At least one example embodiment provides a social network service providing method implemented with a computer, the method comprising: receiving at least one control condition for controlling operation of a messenger; generating a folder having a driving condition including the at least one control condition; associating at least one chat room with the folder; and determining whether to control operation of the messenger based on the at least one control condition, in response to a message from a messenger partner associated with the at least one chat room.

At least one other example embodiment provides a non-transitory computer-readable recording medium including an computer-executable instructions that, when executed by a computer system, cause the computer system to perform a method comprising: receiving at least one control condition for controlling operation of a messenger; generating a folder having a driving condition including the at least one control condition; associating at least one chat room with the folder; and determining whether to control operation of the messenger based on the at least one control condition, in response to a message from a messenger partner associated with the at least one chat room.

According to at least some example embodiments, the at least one control condition may include at least one of a time, a location, a nation, an account, a keyword, and content for controlling operation of the messenger.

The associating may include associating, with the folder, at least one of a friend, a friend group, a one-to-one chat room, and a group chat room, as a target to which the at least one control condition is applied.

The method may further include blocking at least one of notification of the message, displaying of the message, generation of a chat room, and displaying of a friend list, based on the at least one control condition.

The method may further include blocking at least one of notification of the message, displaying of the message, and generation of a chat room, at a specific time slot when the at least one control condition is associated with the specific time slot.

The method may further include blocking the messenger partner from a friend list on the messenger at a specific time slot when the at least one control condition is associated with the specific time slot.

The method may further include allowing the blocked at least one of the notification of the message, the displaying of the message, the generation of the chat room, and the displaying of the friend list, in response to release of the at least one control condition.

The associating may further include setting at least one of a friend, a friend group, a one-to-one chat room, and a group chat room, as an exception target to be excluded from the blocking of the at least one of the notification of the message, the displaying of the message, the generation of the chat room, and the displaying of the friend list.

The method may further include automatically sending a message indicating absence of a user from a user terminal to the messenger partner in response to the message in a state where (i) the user terminal is in an absence state or (ii) the at least one control condition is associated with an automatic response function, and the automatic response function is activated.

The method may further include generating a chat room in response to a request to generate the chat room through the folder, and in response to registration of a target as being (i) at least one of a friend, (ii) with a friend group, (iii) with a one-to-one chat room, and (iv) with a group chat room. The target may be a conversation partner in the generated chat room.

At least one other example embodiment provides a messenger service system comprising: a memory having computer-readable instructions stored therein; and at least one processor. The at least one processor is configured to execute the computer-readable instructions to: generate, in response to receiving at least one control condition for controlling operation of a messenger, a folder having a driving condition including the at least one control condition; associate at least one chat room with the folder; and determine whether to control operation of the messenger based on the at least one control condition, in response to a message from a messenger partner associated with the at least one chat room.

The at least one control condition may include at least one of a time, a location, a nation, an account, a keyword, and content, for controlling operation of the messenger.

The at least one processor may be further configured to associate, with the folder, at least one of a friend, a friend group, a one-to-one chat room, and a group chat room, as a target to which the at least one control condition is applied.

The at least one processor may be further configured to block at least one of notification of the message, displaying of the message, generation of a chat room, and displaying of a friend list, based on the at least one control condition.

The at least one processor may be further configured to block at least one of notification of the message, displaying of the message, and generation of a chat room, at a specific time slot when the at least one control condition is associated with the specific time slot.

The at least one processor may be further configured to block the messenger partner from a friend list on the messenger at a specific time slot when the at least one control condition is associated with the specific time slot.

The at least one processor may be further configured to allow the blocked at least one of the notification of the message, the displaying of the message, the generation of the chat room, and the displaying of the friend list, in response to release of the at least one control condition.

The at least one processor may be further configured to set at least one of a friend, a friend group, a one-to-one chat room, and a group chat room, as an exception target to be excluded from the blocking of the at least one of the notification of the message, the displaying of the message, the generation of the chat room, and the displaying of the friend list.

The at least one processor may be further configured to automatically send a message indicating absence of a user from a user terminal to the messenger partner in response to the message in a state where (i) the user terminal is in an absence state or (ii) the at least one control condition is associated with an automatic response function, and the automatic response function is activated.

The at least one processor may be further configured to generate a chat room in response to a request to generate the chat room through the folder, and in response to registration of a target as being (i) at least one of a friend, (ii) with a friend group, (iii) with a one-to-one chat room, and (iv) with a group chat room. The target may be a conversation partner in the generated chat room.

BRIEF DESCRIPTION OF THE FIGURES

Inventive concepts will become apparent from the following description of the figures, wherein like reference numerals refer to like parts throughout the various figures unless otherwise specified, and wherein.

DETAILED DESCRIPTION

Figure 1:
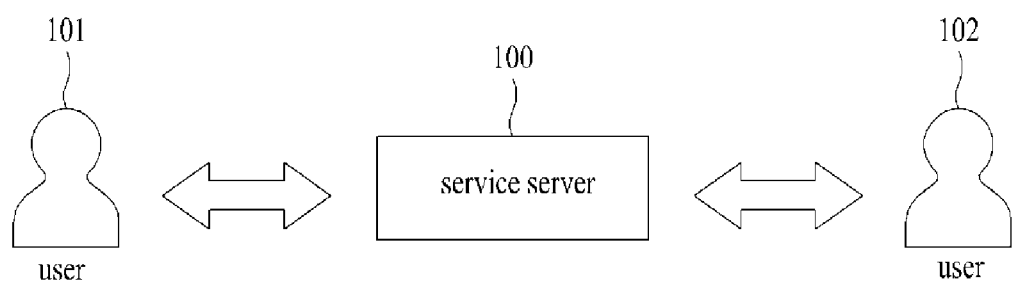
FIG. 1 is a diagram schematically illustrating a relationship between a user and a service server, according to an example embodiment of inventive concepts.

One or more example embodiments will be described in detail with reference to the accompanying drawings. Inventive concepts, however, may be embodied in various different forms, and should not be construed as being limited only to the illustrated embodiments. Rather, these embodiments are provided as examples so that this disclosure will be thorough and complete, and will fully convey the concept of inventive concepts to those skilled in the art. Accordingly, known processes, elements, and techniques are not described with respect to some of example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing example embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

In the description below, it will be understood that when an element such as a layer, region, substrate, plate, or member is referred to as being "on" another element, it can be directly on the other element or intervening elements may be present. In contrast, the term "directly" means that there are no intervening elements.

Below, example embodiments of inventive concepts will be described in detail with reference to accompanying drawings.

One or more example embodiments of inventive concepts relate to instant messengers, and in particular, to methods, systems, and/or non-transitory computer-readable storage mediums, capable of controlling operations of messengers using a specific condition.

Messenger services may be used for various purposes including personal purposes and transactional purposes. Furthermore, conversation partners may be divided into various groups for management or the purpose of use.

Inventive concepts relate to improving convenience of users in an environment where a messenger is used without distinction and provides technology for controlling an operation of a messenger using a specific condition by specifying a use condition of a messenger.

The messenger or messenger service may correspond to a social network service or a part of the social network service. Thus, hereinafter, the terms "messenger", "messenger service", and "social network service" may be used interchangeably.

FIG. 1 is a diagram schematically illustrating a relationship between a user and a service server, according to an example embodiment of inventive concepts. In FIG. 1, there are illustrated a service server 100 and users 101 and 102. In FIG. 1, arrows indicate the capability of transmitting and receiving data between the service server 100 and a user terminal through a wired/wireless network.

A user terminal, which each of the users 101 and 102 uses, may be a personal computer (PC), a laptop computer, a smart phone, a tablet, a wearable computer, and the like, and may refer to all terminal devices capable of installing and executing a messenger service-dedicated application (hereinafter referred to as "messenger app") associated with the service server 100. Here, under the control of the messenger app, the user terminal may perform an overall operation of a service including service screen construction, data input, data transmission and reception, data storage, and the like.

The service server 100 may act as a service platform, which provides a messenger service to a client. In other words, for example, the service server 100 may be a system which provides a messenger capable of sending and receiving data between terminals of the users 101 and 102 at which the messenger app is installed, in real time. The messenger app may basically include a function for making a text, a function for sending multimedia contents (e.g., voice, photo, video, and the like), a message notification function, a schedule function, and the like. In particular, for example, the messenger app according to one or more example embodiments of inventive concepts may include a function for controlling an operation of the messenger under a specific condition by specifying a use condition of a messenger through a folder. This function may be referred to as a "folder function". The folder function will be described in more detail later. The messenger app may be implemented so as to be used in a mobile environment as well as a PC environment. The messenger app may be implemented in the form of one or more programs operating independently, or may be constructed in the form of in-app of a specific application to operate on the specific application.

Figure 2:
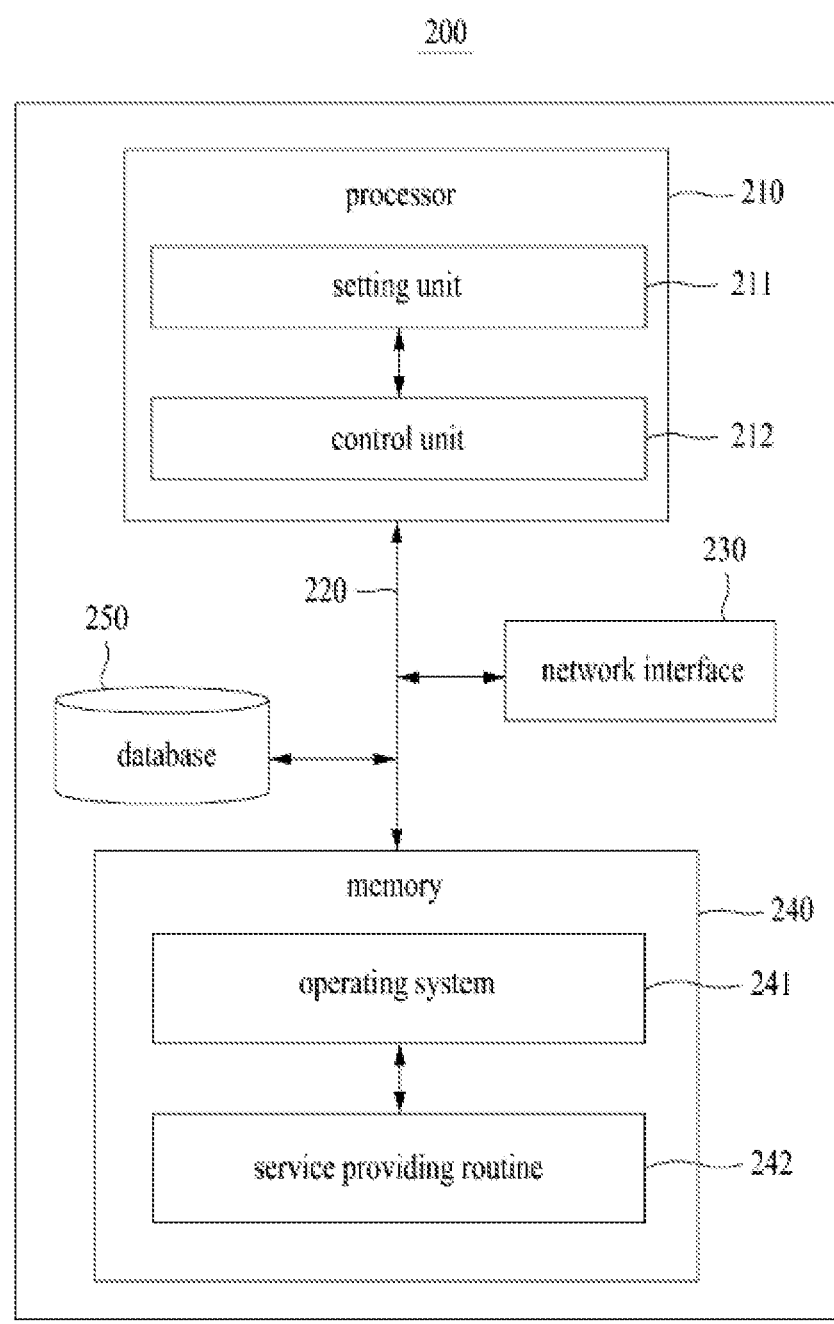
FIG. 2 is a block diagram illustrating an example internal configuration of a social network service providing system, according to an example embodiment of inventive concepts.
Figure 3:
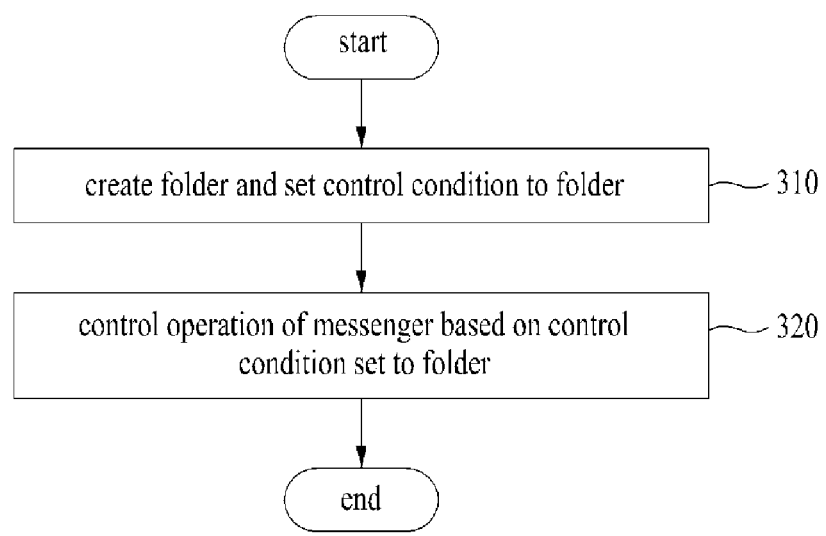
FIG. 3 is a flow chart illustrating a social network service method according to an example embodiment of inventive concepts.

FIG. 2 is a block diagram illustrating an example internal configuration of a social network service providing system, according to an example embodiment of inventive concepts. FIG. 3 is a flow chart illustrating a social network service providing method according to an example embodiment of inventive concepts.

A social network service providing system 200 according to an example embodiment of inventive concepts may include a processor 210, a bus 220, a network interface 230, a memory 240, and database 250. The memory 240 may include an operating system 241 and a service providing routine 242. The processor 210 may include a setting unit 211 and a control unit 212. In one or more other example embodiments, the social network service providing system 200 may include components of which the number is more than that of FIG. 2.

The memory 240 may be a computer-readable recording medium and may include a random access memory (RAM), a read only memory (ROM), and a permanent mass storage device such as a disk drive. Stored in the memory 240 is program code for the operating system 241 and the service providing routine 242. Such software components may be loaded from a computer-readable recording medium, which is independent of the memory 240, using a drive mechanism (not illustrated). The computer-readable recording medium independent of the memory 240 may include a computer-readable recording medium, such as a floppy drive, a disk, a tape, a DVD/CD-ROM drive, a memory card, or the like. In one or more other example embodiments, software components may be loaded on the memory 240 through the network interface 230, not the computer-readable record medium.

The bus 220 may enable communication and data transmission to be performed between components of the social network service providing system 200. The bus 220 may be implemented using a high-speed serial bus, a parallel bus, a storage area network (SAN), and/or any other appropriate communication technology.

The network interface 230 may be a computer hardware component for connecting the social network service providing system 200 to a computer network. The network interface 230 may connect the social network service providing system 200 to a computer network through a wired and/or wireless connection.

The database 250 may store and retain all information needed to provide a messenger service. Here, the database 250 may include a friend list registered on a messenger, messages and data (e.g., photos, videos, voice, and the like) exchanged through messenger, various logs, and the like. In particular, for example, the database 250 may include information (e.g., a control condition, a control target, and the like, of each folder) associated with the folder function. In FIG. 2, an example embodiment of inventive concepts is exemplified as the database 250 is implemented in the social network service providing system 200. However, the scope and spirit of inventive concepts should not be limited thereto. For example, the database 250 may be omitted according to a system implementation manner or environment, or the whole or a portion of the database 250 may be implemented with an external database constructed on a separate other system.

The processor 210 may process instructions of a computer program by performing a basic arithmetic operation, a logic operation, and an input/output operation of the social network service providing system 200. The memory 240 or the network interface 230 may provide the instructions to the processor 210 through the bus 220. The processor 210 may be configured to execute program code for the setting unit 211 and the control unit 212. The program code may be stored at a recording device such as the memory 240.

The social network service providing system 200 may be implemented on a user terminal at which a user directly utilizes a messenger service, and may provide a folder function for controlling an operation of a messenger with respect to a user terminal, in connection with a service server at a client-server environment.

The setting unit 211 and the control unit 212 may be configured to perform steps 310 and 320 in FIG. 3.

Referring to FIGS. 2 and 3, in step 310 the setting unit 211 may make a folder on a messenger for a folder function of a messenger, and may set a control condition of the messenger to a corresponding folder. In this specification, the folder function may mean that operation conditions of the messenger are classified and arranged according to folders. The folders may be associated with at least one chatting element of the messenger or the social network service. The chatting element may include at least one of a friend, a friend group, a one-to-one chat room, and a group chat room, and the chatting element may be a target to which the control condition is applied.

Here, the control condition may mean a specific condition to be applied to a folder as a condition for controlling an operation of the messenger. The setting unit 211 may set at least one of conditions, such as a time, a location, a nation, an account, a keyword, contents, and the like, as the specific condition to be applied to the folder. For example, the setting unit 211 may set a time condition so as to restrict operation of the messenger during a specific time. As another example, the setting unit 211 may set a location condition so as to restrict operation of the messenger at a specific location. As still another example, the setting unit 211 may set a time condition and a location condition so as to restrict operation of the messenger at a specific location during a specific time. Alternatively, the setting unit 211 may set a nation condition to block data received from a specific nation. As other example, the setting unit 211 may set an account condition to block data received from a specific account. Alternatively, the setting unit 211 may set a keyword condition to block receiving of data in which a specific keyword is included. As still another example, the setting unit 211 may set a contents condition for blocking receipt of a specific type of contents.

Furthermore, the setting unit 211 may set an automatic response message as a control condition to be applied to a folder. In other words, for example, in the case where a state of a user terminal is changed into an absence state or an automatic response function is activated, the setting unit 211 may set a message for automatically answering a person which sends a message.

The setting unit 211 may set a control target of a folder based on a control condition set to the folder. Here, the control target may be a target to which a specific condition set to a folder is applied and may include a friend, a chat room, and the like. For example, the setting unit 211 may register at least one friend or at least one group selected from a friend list on a messenger by a user, as a target for restricting operation of the messenger. Alternatively, the setting unit 211 may register a one-to-one chat room or a group chat room selected from a conversation list on the messenger by a user, as a target for restricting operation of the messenger. In this case, the setting unit 211 may perform the setting such that an operation of the messenger is allowed by designating a specific one of control targets set to a folder. For example, in the case where a specific group is set as a control target, a specific friend of the specific group may be designated as VIP (very important person), thereby making it possible to exclude the specific friend from control targets for restricting an operation of the messenger.

When selectively restricting operation of the messenger, any other control conditions and targets in addition to the above-described control conditions and targets may be used. In contrast, control conditions and targets may be set such that operation of the messenger is allowed.

Still referring to FIGS. 2 and 3, in step 320 the control unit 212 may control an operation of the messenger based on a control condition set to a folder. In this case, the control unit 212 may restrict at least one of the following operations based on a control condition designated through a folder on a messenger: message reception, notification of message reception, display of received message, generation of a chat room, addition of a friend list, and the like.

In the case where a specific time and a specific friend are set to a folder, for example, the control unit 212 may block the following operations during the specific time: generation of a chat room with the specific friend, notification (e.g., a badge count and the like) on a message received from the specific friend, and the like. This may be referred to as a "timer function". A message received when an operation of the messenger is blocked may be stored at database of the messenger. When the specific time elapses, a chat room may be made using the stored information, or notification of message reception may be shown at a chat room. Alternatively, in the case where a specific time and a specific friend are designated at a folder, the control unit 212 may block the specific friend during the specific time so as not to be shown at a friend list, and may also block generation of a chat room with the specific friend. This may be referred to as a "block function". Likewise, a message received during blocking may be stored at the database. When the specific time elapses, the specific friend may return to the friend list. At the same time, a chat room may be generated using the stored information, or notification of message reception may be shown at a chat room.

As another example, in the case where a specific location (area) is designated as a control condition at a folder, the control unit 212 may block generation of a chat room and notification of a received message while a user terminal is in the specific location (area). A message received during blocking may be stored at the database of the messenger. When the user terminal moves from the specific location, a chat room may be generated using the stored information, or notification of message reception may be shown at a chat room. This may be referred to as a "location restriction function".

As still another example, if a specific nation is designated as a control condition at a folder, the control unit 212 may process a message received from the specific nation as a spam message, that is, may block the message. Besides, as described above, in the case where a specific account, a specific keyword, and contents of a specific type are respectively designated as a control condition of a folder, a message or data may be blocked according to a corresponding condition, thereby making it possible to restrict one or more operations of the messenger based on various conditions set to the folder.

According to at least some example embodiments, the control unit 212 may allow an operation of the messenger with respect to a specific target, corresponding to VIP, from among control targets set to a folder. This may be referred to as a "VIP function". For example, if a specific friend group is designated at a folder as a control condition, as a rule, an operation of the messenger may be restricted by the folder with respect to the specific friend group. However, if a message is received from a specific user designated as a VIP of the specific friend group, a chat room may be forcibly opened. In other words, the VIP function may allow a user to receive a message normally even though a message necessitating confirmation is received under a situation where an operation of the messenger is restricted.

In the case where an automatic response message is designated at a folder as a control condition, if a message is received at a state where a state of a user terminal is switched into an absence state or an automatic response function is activated, then the control unit 212 may automatically send an automatic response message to a person sending the message. This may be referred to as an "automatic response function". In other words, for example, if a message is received in the absence of a user, an automatic response message (e.g., I'm away) set by a folder may be automatically sent to other user to provide notification that a user does not check a message right now.

Furthermore, the control unit 212 may generate a chat room using a folder. For example, in the case where at least one friend or group, selected by a user, from among a friend list on a messenger is registered at a folder, if a user requests generation of a chat room through the folder, then the control unit 212 may generate a one-to-one chat room or a group chat room on a target registered at the folder. This may be referred to as a "chat room generation function". In other words, for example, if a user requests generation of a chat room on a folder after moving a friend or a group from a friend list to the folder, chat rooms with friends or groups in the folder may be generated in a group or together through only one request. In this case, if a friend or group selected by a user is moved to a folder to which a specific condition is set, then a generated chat room may be controlled according to the specific condition set to the folder.

According to at least one example embodiment of inventive concepts, operation of a messenger may be restricted according to a specific condition using a folder. A message received while operation of the messenger is restricted may be stored at database on a client, and operation of the messenger may be restored using information stored at the database at a point in time when a restriction condition is released. Such a folder function may be controlled by a client and may be implemented without burdening a service server. However, synchronization between a client and a service server may be required to synchronize a personal computer and a mobile with respect to a mobile app.

Figure 4:
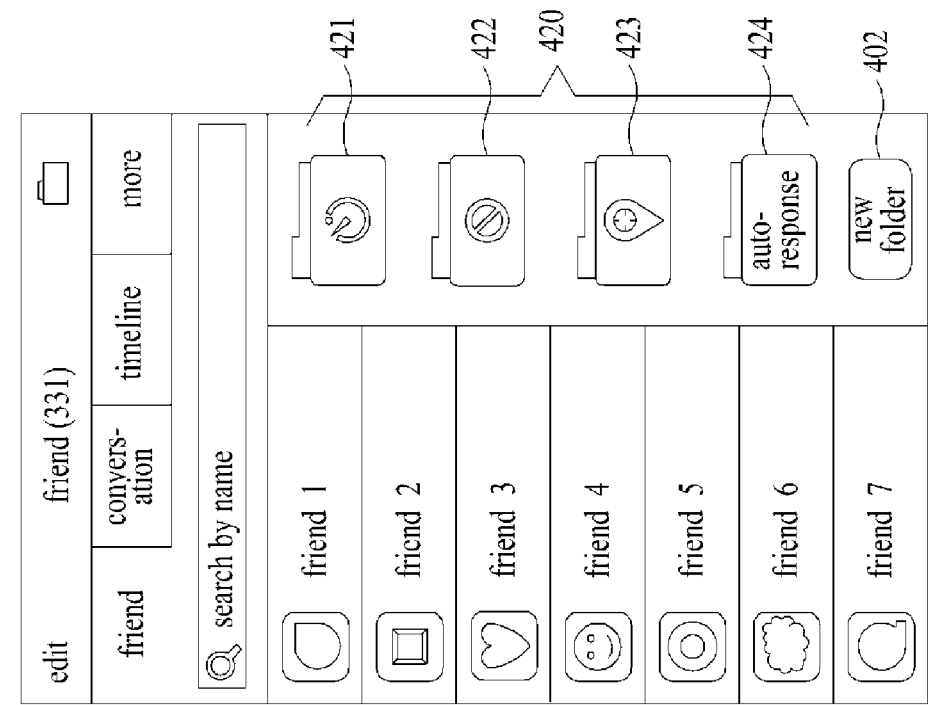
FIG. 4 is a diagram illustrating an example setting screen of a folder function, according to an example embodiment of inventive concepts.
Figure 4:
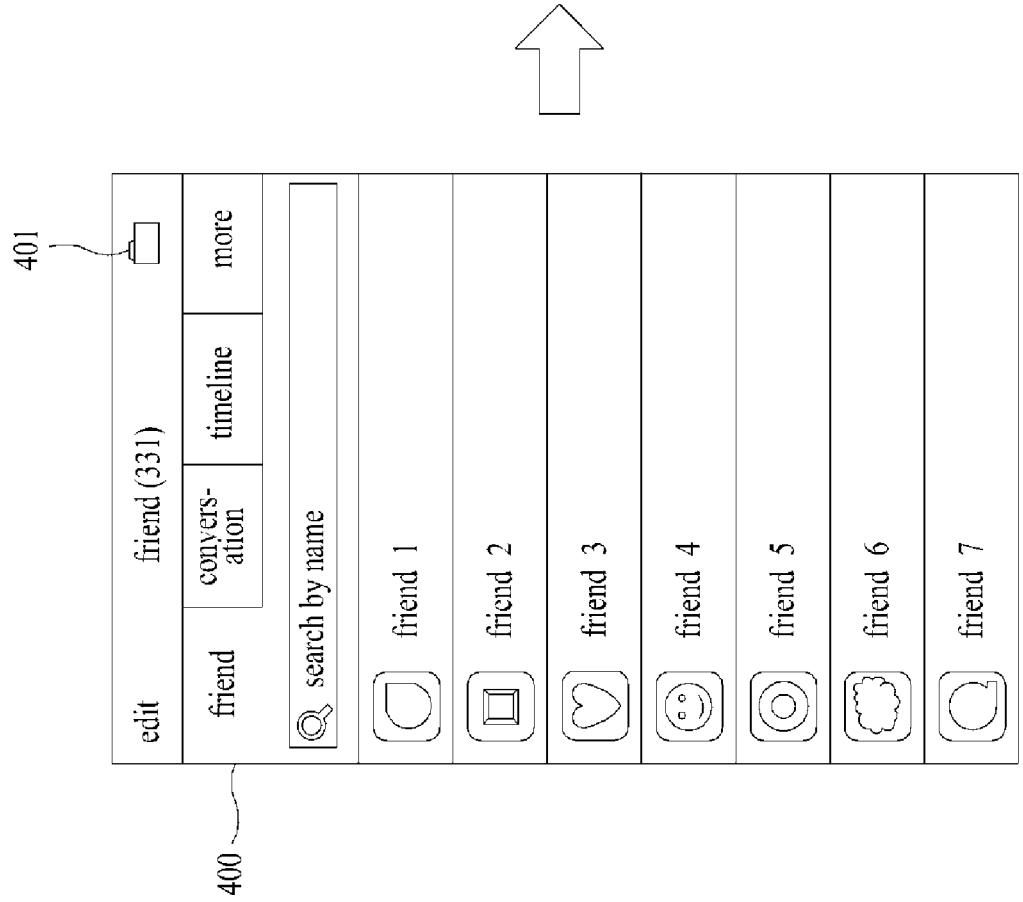

FIG. 4 is a diagram illustrating a setting screen of a folder function according to an example embodiment of inventive concepts.

Referring to FIG. 4, a messenger screen 400 (e.g., a friend list, a conversation list, and the like) may include a folder menu 401 for access to a setting environment of a folder function. A setting screen of the folder function may be provided when a user selects the folder menu 401, and a folder list 420 set on a messenger may be arranged and shown on the setting screen.

The folder list 420 may include folders to which control conditions are set, for example, a "timer function" folder 421, a "block function" folder 422, a "location restriction function" folder 423, an "automatic response function" folder 424, and the like. Besides, the folder list 420 may further include additional folders generated to apply control conditions, such as a nation, an account, a keyword, contents, and the like, by a user.

A "new folder" menu 402 for generating a new folder may be displayed on the setting screen of the folder function together with the folder list 420. A user may generate a folder with a desired messenger control condition using the "new folder" menu 402.

In folders, a folder type may be selected in generating a folder, and a control condition fit to a corresponding type may be set to a folder. Alternatively, a folder type may be decided according to a control condition set by a user.

Accordingly, a user may generate a folder for controlling an operation of a messenger, may designate a specific condition to be applied to the folder, and may designate a control target, to which a condition set to the folder is applied, based on the folder.

Figure 5:
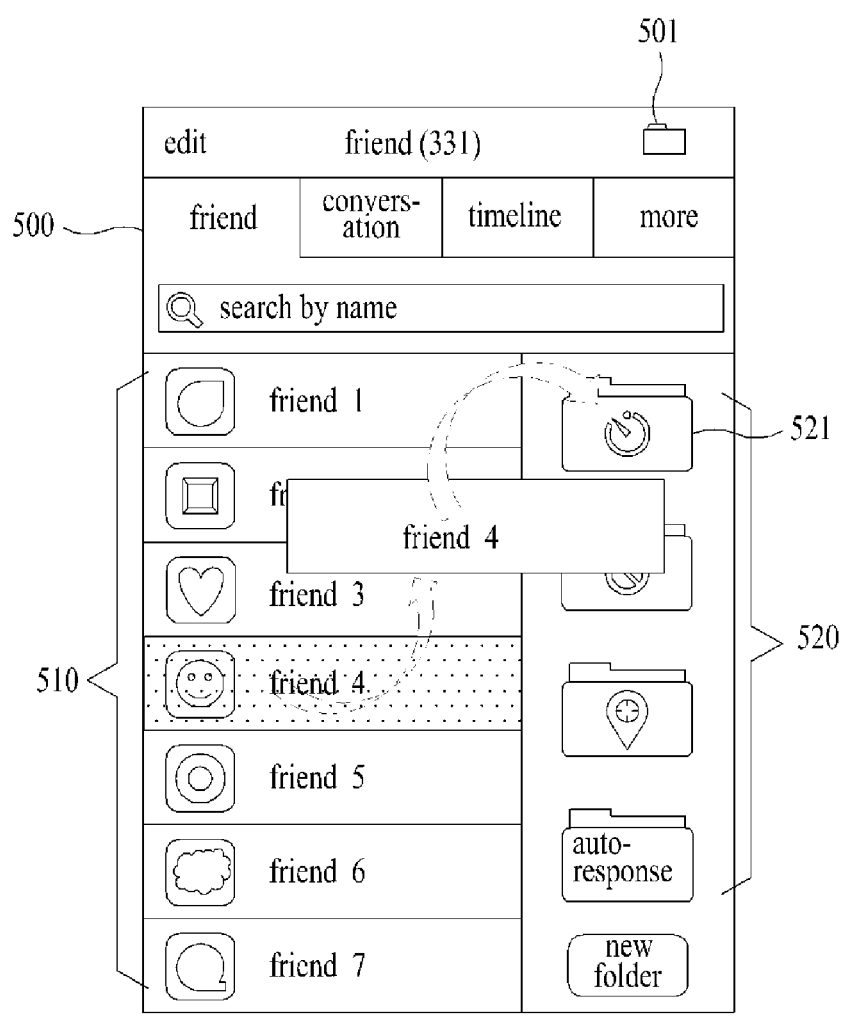
FIG. 5 is a diagram illustrating a process for registering a control target at a folder, according to an example embodiment of inventive concepts.

FIG. 5 is a diagram illustrating a process for registering a control target at a folder, according to an example embodiment of inventive concepts.

Referring to FIG. 5, a folder list 520 may be displayed on a messenger screen 500 through screen division in selecting a folder menu 501. At this time, a control target may be registered at a corresponding folder by selecting a friend or group from a friend list 510 and moving it to a specific folder, for example, a 'timer function" folder 521 in a drag and drop manner. As well as the friend list 510, a specific chat room of a conversation list may be moved to a folder to register it as a control target. Alternatively, it may be possible to register a control target at a specific folder using a separate user interface (UI) or an input manner such as log tap and the like.

Figure 6:
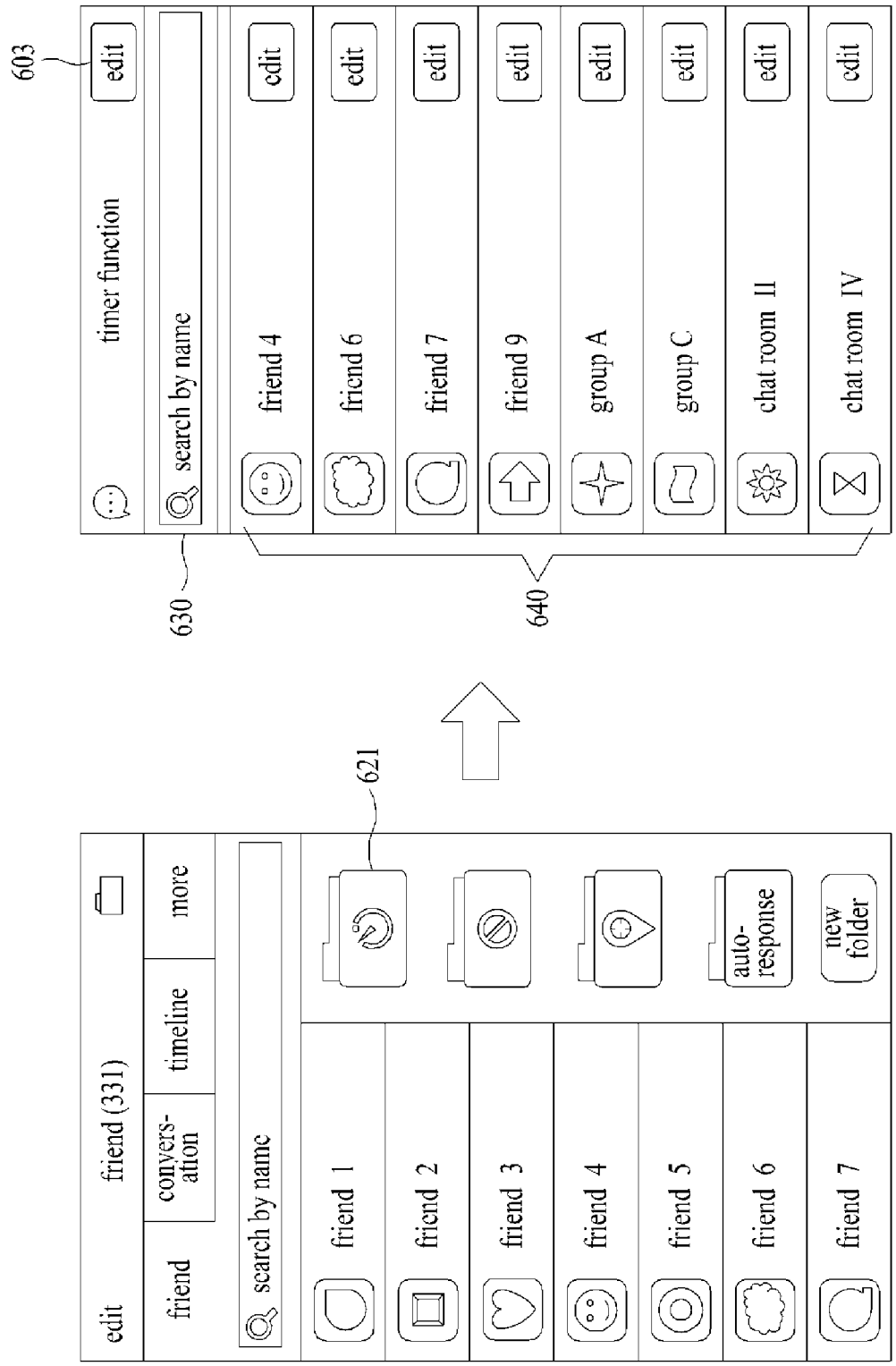
FIGS. 6 and 7 are diagrams illustrating a process for checking a control condition and a control target set to a folder, according to an example embodiment of inventive concepts.
Figure 7:
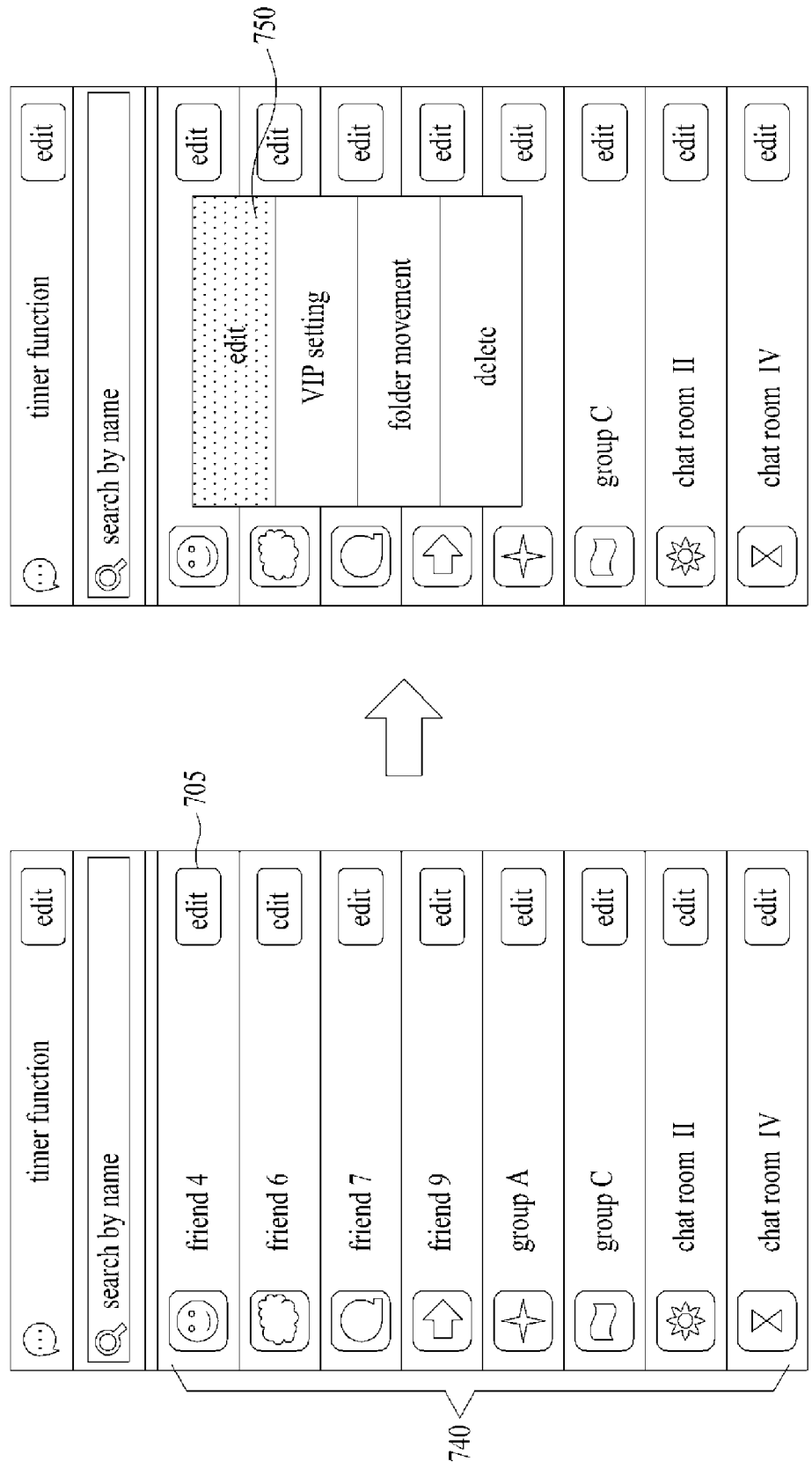

FIGS. 6 and 7 are diagrams illustrating a process for checking a control condition and a control target designated at a folder, according to an example embodiment of inventive concepts.

Referring to FIG. 6, if a specific folder of a folder list, for example, a "timer function" folder 621 is selected, there may be displayed a folder details screen 630 corresponding to the "timer function" folder 621. A control target list 640 registered at the "timer function" folder 621, for example, friends, friend groups, one-to-one chat rooms, group chat rooms, and the like may be arranged and displayed on the folder details screen 630, thereby making it possible for a user to check friends and chat rooms, designated at the "timer function" folder 621, through a control target list 640 of the folder details screen 630.

An "edit" menu 603 for checking and editing a control condition set to the "timer function" folder may be displayed together on the folder details screen 630, thereby making it possible to check or edit a detailed time condition set to the "timer function" folder using the "edit" menu 603.

Furthermore, referring to FIG. 7, a control target list 740 may include an "edit" menu 705 for editing a control target at a folder. In this case, an edit screen 750 on a control target may be displayed when the "edit" menu 705 is selected.

For example, the "edit" menu 705 may include a menu for setting a control target to VIP, a menu for moving or copying a control target to any other folder, a menu for deleting a control target from a folder, and the like. Accordingly, after checking a friend or a chat room designated at a folder through the control target list 740, a user may perform the following edit based on the "edit" menu 705: setting of the designated friend or chat room to a VIP, moving (or copying) of a folder, deleting of the designated friend or chat room from a folder, and the like.

Figure 8:
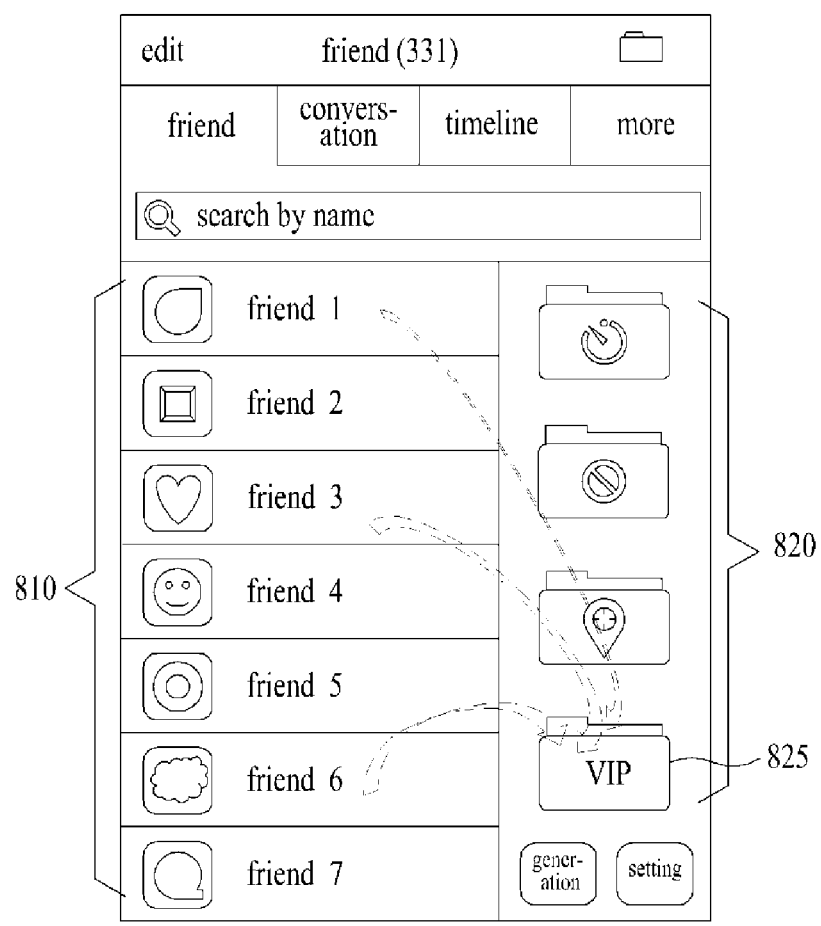
FIG. 8 is a diagram illustrating a process for setting a VIP, according to an example embodiment of inventive concepts.

As another example for setting a VIP, as illustrated in FIG. 8, a VIP target may be registered at a folder by separately generating a "VIP function" folder 825 at a folder list 820 and moving a friend or group of a friend list 810 to the "VIP function" folder 825 (or dragging a chat room of a conversation list to the "VIP function" folder 825). Even though a control target registered at the "VIP function" folder 825 is designated at another folder, the VIP target may be excluded from targets, restricted with respect to an operation of a messenger, in high priority.

Figure 9:
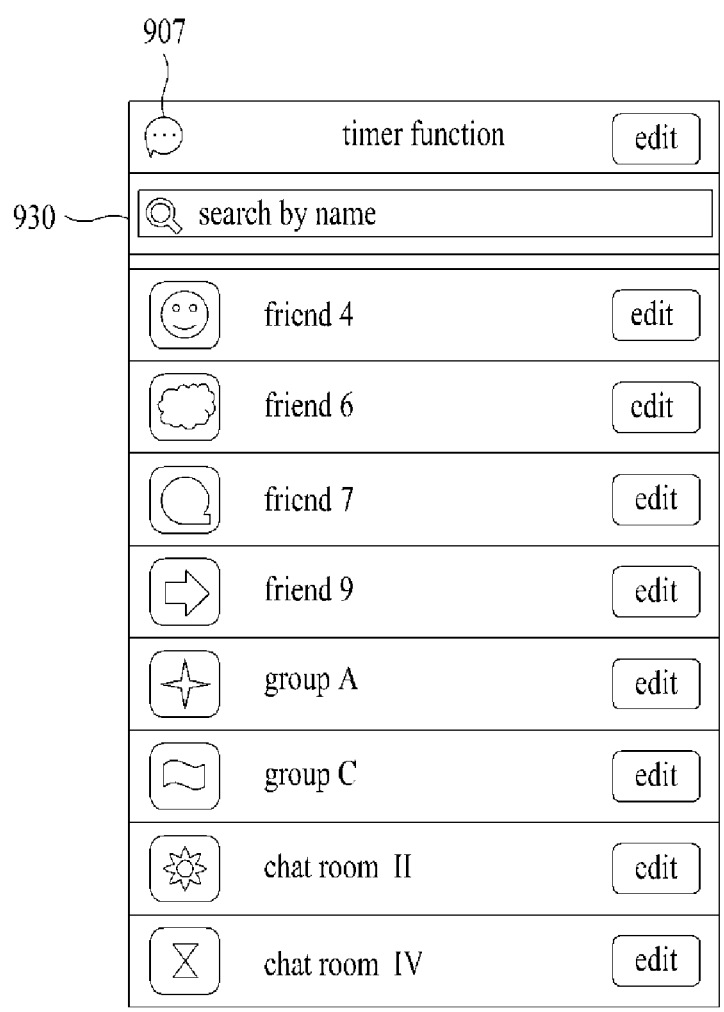
FIGS. 9 and 10 are diagrams illustrating a process for generating a chat room, according to an example embodiment of inventive concepts.

As illustrated in FIG. 9, also, a "chat room generation" menu 907 for generating a chat room with respect to a control target registered at a folder may be displayed on a folder detailed screen 930, thereby making it possible to generate chat rooms (one-to-one chat rooms or group chat rooms) in which all or a part of control targets registered at a folder are conversation partners, in a group or together using the "chat room generation" menu 907. In this case, the generated chat room may be a chat room controlled according to a control condition set to a folder, for example, a timer function.

Figure 10:
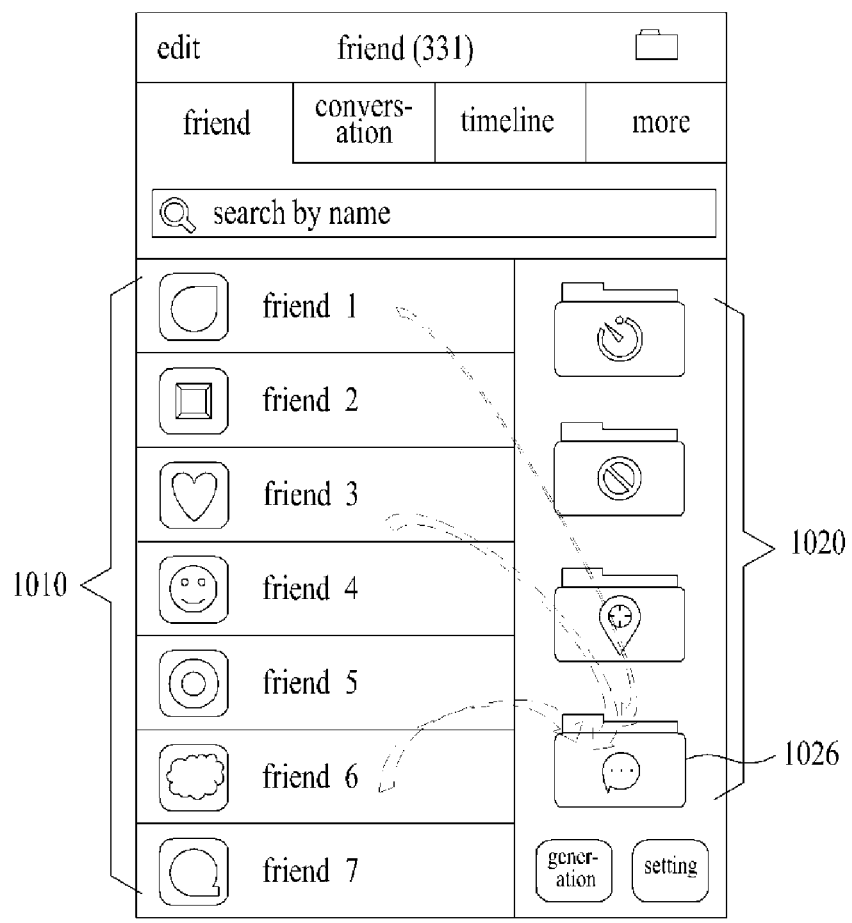

In still another example for setting a VIP, as illustrated in FIG. 10, a "chat room generation function" folder 1026 may be separately generated at a folder list 1020, and a friend or group of a friend list 1010 (or a chat room of a conversation list) may be moved to the "chat room generation function" folder 1026 in a drag and drop manner. That is, for example, if a user moves a friend or group of the friend list 1010 to the "chat room generation function" folder 1026 and requests generation of a chat room on the "chat room generation function" folder 1026, chat rooms with friends or groups moved to the "chat room generation function" folder 1026 may be generated in a group or together through only one request.

Example screens illustrated in FIGS. 4 to 10 may help understanding of the scope and spirit of inventive concepts. However, example embodiments should not be limited to these examples. A screen construction, a screen order, and the like may be variously changed or modified.

Figure 11:
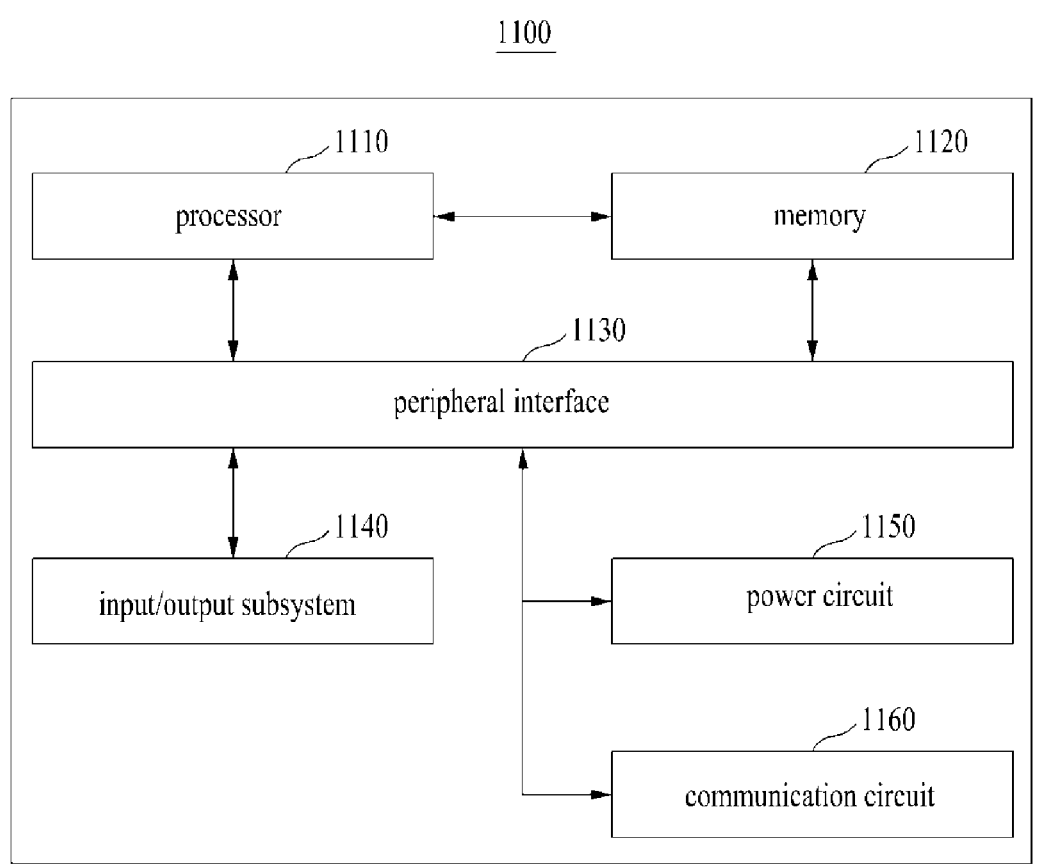
FIG. 11 is a block diagram schematically illustrating an example internal configuration of a computer system, according to an example embodiment of inventive concepts.

FIG. 11 is a block diagram schematically illustrating an example internal configuration of a computer system according to an example embodiment of inventive concepts.

As illustrated in FIG. 11, a computer system 1100 may include at least one processor 1110, a memory 1120, a peripheral interface 1130, an input/output subsystem 1140, a power circuit 1150, and a communication circuit 1160. Here, the computer system 1100 may correspond to a user terminal.

For example, the memory 1120 may include a high-speed random access memory (RAM), a magnetic disc, a static RAM, a dynamic RAM, a read only memory (ROM), a flash memory, or a nonvolatile memory. The memory 1120 may include a software module, a command set, or a variety of data necessary for an operation of the computer system. The processor 1110 may control an access to the memory 1120 from the processor 1110 or any other component (e.g., the peripheral interface 1130).

The peripheral interface 1130 may couple a peripheral input and/or output device of the computer system 1100 to the processor 1110 and the memory 1120. The processor 1110 may execute a software module or a command set stored at the memory 1120 to perform a variety of functions for the computer system 1100 and to process data.

The input/output subsystem 1140 may couple a variety of peripheral input/output devices to the peripheral interface 1130. For example, the input/output subsystem 1140 may include a controller for coupling a monitor, a keyboard, a mouse, a printer, or a peripheral device, such as a touch screen or a sensor, to the peripheral interface 1130. According to another aspect, peripheral input/output devices may be coupled to the peripheral interface 1130 without passing through the input/output subsystem 1140.

All or a part of components of a terminal may be powered by the power circuit 1150. For example, the power circuit 1150 may include a power management system, one or more power sources such as a battery or an alternating current (AC), a charging system, a power failure detection circuit, a power converter or inverter, a power status indicator, or any other components for power generation, management, and distribution.

The communication circuit 1160 may communicate with other computer system using at least one external port. As described above, the communication circuit 1160 may include a radio-frequency (RF) circuit and may communicate with other computer system by transmitting and receiving an RF signal known as an electromagnetic signal.

The computer system 1100 illustrated in FIG. 11 is an example. The computer system 1100 may not include some of components illustrated in FIG. 11, may further include components not illustrated in FIG. 11, or may be implemented such that two or more components are combined. For example, the computer system 1100 for a mobile terminal of a communication environment may include a touch screen, a sensor, and the like as well as components illustrated in FIG. 11, and the communication 1160 may include circuits for RF communications such as wireless-fidelity (Wi-Fi), 3G, long term evolution (LTE), Bluetooth, near field communication (NFC), Zigbee, and the like. Components capable of being included in the computer system 1100 may be implemented with hardware, including an integrated circuit specialized for one or more signal processing or an application, software, or a combination thereof.

Methods according to one or more example embodiments of inventive concepts may be implemented in the form of program instruction executable through various computer systems and may be recorded on non-transitory computer-readable storage mediums.

According to one or more example embodiments of inventive concepts, a program according to an example embodiment of inventive concepts may be a PC-based program or an application dedicated to a mobile terminal. A messenger application to which inventive concepts is applied may be installed on a user terminal through a file which a file distribution system provides. For example, the file distribution system may include a file transfer unit (not illustrated), which transfers the file in response to a request of a user terminal.

Some operations may be omitted or added from or to the above-described social network service providing method based on a detailed description of a social network service providing system described with reference to FIGS. 1 to 10. Furthermore, two or more operations may be combined, and an order of operations or positions thereof may be changed.

As such, according to one or more example embodiments of inventive concepts, quality of service may be improved through service enhancement and service differentiation by specifying a use condition of a messenger through a folder and controlling an operation of the messenger using a specific condition. Additionally, according to one or more example embodiments of inventive concepts, use convenience and/or usability of the messenger may be improved through a refined use environment by selectively restricting operation of the messenger through setting of various conditions such as a time, a location, a nation, and the like.

The units (or devices) described herein may be implemented using hardware components, software components, and/or a combination thereof. For example, devices and components described therein may be implemented using processing circuitry such as, but not limited to, a processor, a controller, an arithmetic logic unit (ALU), a digital signal processor, a microcomputer, a field programmable gate array (FPGA), a programmable logic unit, a microprocessor or any other device capable of responding to and executing instructions in a defined manner. The processing circuitry and/or hardware devices (also sometimes referred to herein as a processing device) may be configured as special purpose processing circuitry and/or hardware devices to perform functions illustrated in one or more of the flow charts or sequence diagrams discussed herein.

A processing device may run an operating system (OS) and one or more software applications that run on the OS. The processing device also may access, store, manipulate, process, and create data in response to execution of the software. For the sake of easy understanding, one or more example embodiments of inventive concepts is/are exemplified as one processing device is used; however, one skilled in the art will appreciate that a processing device may include multiple processing elements and multiple types of processing elements. For example, a processing device may include multiple processors or a processor and a controller. In addition, other processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

Methods according to one or more example embodiments may be implemented in the form of program instruction executable through various computing devices and may be recorded in a non-transitory computer-readable storage medium. The computer-readable medium may also include program instructions, data files, data structures, and the like independently or in the form of combination. The program instructions recorded in the medium may be those specially designed and constructed for the embodiment or may be well-known and available to those skilled in the computer software arts. Examples of the computer-readable medium may include magnetic media such as hard disks, floppy disks, and magnetic tape; optical media such as CD ROM disks and DVD; magneto-optical media such as floptical disks; and hardware devices that are specialized to store and perform program instructions, such as read-only memory (ROM), random access memory (RAM), flash memory, and the like. Examples of program instructions may include both machine code produced by a compiler and high-level code executed by the computer using an interpreter. The described hardware devices may be configured to operate as one or more modules or units to perform the operations of the above-described example embodiments, and vice versa Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to one or more example embodiments of inventive concepts, a portion of a menu displayed at an official account interface may be freely used according to various intentions or uses of an official account manager, by providing a tool which allows the official account manager inputs a desired label through a menu of the official account interface.

According to one or more example embodiments of inventive concepts, a new communication channel with an official account may be implemented by providing a rich menu associated with an official account to the official account interface and providing content previously set by the official account manager through the official account interface in selecting the rich menu.

While inventive concepts has been described with reference to example embodiments, it will be apparent to those skilled in the art that various changes and modifications may be made without departing from the spirit and scope of inventive concepts. Therefore, it should be understood that the above embodiments are not limiting, but illustrative.

What is claimed is:
1. A social network service providing method implemented with a user terminal including a processor, the method comprising:
 providing a folder function for controlling an operation of a social network service with respect to the user terminal, the folder function having a graphical user interface including an edit option;

receiving, from a user of the user terminal, at least one control condition for controlling operation of the social network service;

generating, by the processor, via the folder function, a plurality of folders, each of the plurality of folders operated by at least one of the at least one control condition;

displaying at least one chatting element of the social network service and at least one folder icon corresponding to at least one of the plurality of folders on the graphical user interface, wherein a description or a symbol indicating a control condition of the at least one control condition associated with the at least one of the plurality of folders is displayed on the at least one folder icon;

associating, by the processor, via the folder function, the at least one chatting element of the social network service with the at least one of the plurality of folders by dragging and dropping the at least one chatting element of the social network service into the at least one folder icon corresponding to the at least one of the plurality of folders on the graphical user interface;

displaying an edit menu including a plurality of options for the control condition for a first chatting element among the at least one chatting element associated with the folder function, the displaying an edit menu being based on user selection of the edit option for the first chatting element and the folder function;

associating at least one of the plurality of options for the control condition with the first chatting element and the folder function, the associating at least one of the plurality of options being based on user selection of the at least one of the plurality of options in the edit menu;

determining whether to control an operation of the social network service in the user terminal based on the at least one control condition, in response to a message from a conversation partner associated with the first chatting element; and controlling, by the processor, the operation of the social network service in the user terminal in response to the determining, the controlling based on the at least one of the plurality of options for the control condition associated with the first chatting element, wherein the controlling includes activating or deactivating, in the user terminal, at least one of notification of the message, display of the message, generation of a chat room associated with the at least one chatting element, or display of a friend list associated with the at least one chatting element, based on the at least one control condition.

2. The social network service providing method of claim 1, wherein the at least one control condition includes at least one of a time, a location, a nation, an account, a keyword, and content for controlling the operation of the social network service.

3. The social network service providing method of claim 1, wherein the at least one chatting element includes at least one of a friend, a friend group, a one-to-one chat room, or a group chat room, and wherein the at least one chatting element is a target to which the at least one control condition is applied.

4. The social network service providing method of claim 1, further comprising:

blocking at least one of the notification of the message, the display of the message, the generation of a chat room, or the display of a friend list, based on the at least one control condition.

5. The social network service providing method of claim 1, further comprising:

blocking at least one of the notification of the message, the display of the message, or the generation of a chat room, at a specific time slot when the at least one control condition is associated with the specific time slot.

6. The social network service providing method of claim 1, further comprising:

blocking the conversation partner from the friend list on the social network service at a specific time slot when the at least one control condition is associated with the specific time slot.

7. The social network service providing method of claim 4, further comprising:

allowing the blocked at least one of the notification of the message, the display of the message, the generation of a chat room, or the display of a friend list, in response to release of the at least one control condition.

8. The social network service providing method of claim 4, wherein the associating comprises:

setting at least one of a friend, a friend group, a one-to-one chat room, or a group chat room, as an exception target to be excluded from the blocking of the at least one of the notification of the message, the display of the message, the generation of a chat room, or the display of a friend list.

9. The social network service providing method of claim 1, further comprising:

automatically sending a message indicating absence of the user from the user terminal to the conversation partner in response to the message in a state where (i) the user terminal is in an absence state or (ii) the at least one control condition is associated with an automatic response function, and the automatic response function is activated.

10. The social network service providing method of claim 1, further comprising:

generating a chat room in response to a request to generate the chat room through one of the plurality of folders and in response to registration of a target as at least one of (i) a friend, (ii) with a friend group, (iii) with a one-to-one chat room, or (iv) with a group chat room, wherein the target is to be a conversation partner in the generated chat room.

11. The social network service providing method of claim 1, further comprising:

displaying a folder details screen in response to receiving a selection of a respective folder icon among the at least one folder icon, the folder details screen including the edit menu and a list including one or more chatting elements among the at least one chatting element of the social network service, the respective folder icon corresponding to a respective folder among the at least one of the plurality of folders, and the one or more chatting elements being associated with the respective folder.

12. A non-transitory computer-readable recording medium including an computer-executable instructions that, when executed by a computer system including a processor, cause the processor to perform a method comprising:

providing a folder function for controlling an operation of a social network service with respect to a user terminal, the folder function having a graphical user interface including an edit option;

receiving, from a user of the user terminal, at least one control condition for controlling operation of the social network service;

generating, by the processor, via the folder function, a plurality of folders, each of the plurality of folders operated by at least one of the at least one control condition;

displaying at least one chatting element of the social network service and at least one folder icon corresponding to at least one of the plurality of folders on the graphical user interface, wherein a description or a symbol indicating a control condition of the at least one control condition associated with the at least one of the plurality of folders is displayed on the at least one folder icon;

associating, by the processor, via the folder function, the at least one chatting element of the social network service with the at least one of the plurality of folders by dragging and dropping the at least one chatting element of the social network service into the at least one folder icon corresponding to the at least one of the plurality of folders on the graphical user interface;

displaying an edit menu including a plurality of options for the control condition for a first chatting element among the at least one chatting element associated with the folder function, the displaying an edit menu being based on user selection of the edit option for the first chatting element and the folder function;

associating at least one of the plurality of options for the control condition with the first chatting element and the folder function, the associating at least one of the plurality of options being based on user selection of the at least one of the plurality of options in the edit menu;

determining whether to control an operation of the social network service in the user terminal based on the at least one control condition, in response to a message from a conversation partner associated with the first chatting element; and controlling, by the processor, the operation of the social network service in the user terminal in response to the determining, the controlling based on the at least one of the plurality of options for the control condition associated with the first chatting element, wherein the controlling includes activating or deactivating, in the user terminal, at least one of notification of the message, display of the message, generation of a chat room associated with the at least one chatting element, or display of a friend list associated with the at least one chatting element, based on the at least one control condition.

13. A social network service providing system comprising:

at least one processor configured to execute computer-readable instructions to provide a folder function for controlling an operation of a social network service with respect to a user terminal, the folder function having a graphical user interface including an edit option;

receive, from a user of the user terminal, at least one control condition for controlling operation of the social network service;

generate, via the folder function, a plurality of folders, each of the plurality of folders operated by at least one of the at least one control condition;

display at least one chatting element of the social network service and at least one folder icon corresponding to at least one of the plurality of folders on the graphical user interface, wherein a description or a symbol indicating a control condition of the at least one control condition associated with the at least one of the plurality of folders is displayed on the at least one folder icon;

associate, via the folder function, the at least one chatting element of the social network service with the at least one of the plurality of folders by dragging and dropping the at least one chatting element of the social network service into the at least one folder icon corresponding to the at least one of the plurality of folders on the graphical user interface;

display an edit menu including a plurality of options for the control condition for a first chatting element among the at least one chatting element associated with the folder function, the edit menu being displayed based on user selection of the edit option for the first chatting element and the folder function;

associate at least one of the plurality of options for the control condition with the first chatting element and the folder function, the at least one of the plurality of options being associated based on user selection of the at least one of the plurality of options in the edit menu;

determine whether to control an operation of the social network service based on the at least one control condition, in response to a message from a conversation partner associated with the first chatting element; and control the operation of the social network service in response to determining to control the operation of the social network service based on the at least one control condition, the operation of the social network service being controlled based on the at least one of the plurality of options for the control condition associated with the first chatting element, wherein the processor is configured to control the operation of the social network service by activating or deactivating, in the user terminal, at least one of notification of the message, display of the message, generation of a chat room associated with the at least one chatting element, or display of a friend list associated with the at least one chatting element, based on the at least one control condition.

14. The social network service providing system of claim 13, wherein the at least one control condition includes at least one of a time, a location, a nation, an account, a keyword, and content, for controlling the operation of the social network service.

15. The social network service providing system of claim 13, wherein the at least one chatting element includes at least one of a friend, a friend group, a one-to-one chat room, or a group chat room, and wherein the at least one chatting element is a target to which the at least one control condition is applied.

16. The social network service providing system of claim 13, wherein the at least one processor is further configured to block at least one of the notification of the message, the display of the message, the generation of a chat room, or the display of a friend list, based on the at least one control condition.

17. The social network service providing system of claim 13, wherein the at least one processor is further configured to block at least one of the notification of the message, the display of the message, or the generation of a chat room, at a specific time slot when the at least one control condition is associated with the specific time slot.

18. The social network service providing system of claim 13, wherein the at least one processor is further configured to block the conversation partner from the friend list on the social network service at a specific time slot when the at least one control condition is associated with the specific time slot.

19. The social network service providing system of claim 16, wherein the at least one processor is further configured to allow the blocked at least one of the notification of the message, the display of the message, the generation of a chat room, or the display of a friend list, in response to release of the at least one control condition.

20. The social network service providing system of claim 16, wherein the at least one processor is further configured to set at least one of a friend, a friend group, a one-to-one chat room, or a group chat room, as an exception target to be excluded from the blocking of the at least one of the notification of the message, the display of the message, the generation of a chat room, or the display of a friend list.

21. The social network service providing system of claim 13, wherein the at least one processor is further configured to automatically send a message indicating absence of the user from the user terminal to the conversation partner in response to the message in a state where (i) the user terminal is in an absence state or (ii) the at least one control condition is associated with an automatic response function, and the automatic response function is activated.

22. The social network service providing system of claim 13, wherein
the at least one processor is further configured to generate a chat room in response to a request to generate the chat room through one of the plurality of folders and in response to registration of a target as at least one of (i) a friend, (ii) with a friend group, (iii) with a one-to-one chat room, or (iv) with a group chat room, wherein the target is to be a conversation partner in the generated chat room.

\* \* \* \* \*